United States Patent [19]

Axelsson et al.

[11] Patent Number: 4,591,381
[45] Date of Patent: May 27, 1986

[54] PROCESS OF PRODUCING PIG IRON FROM IRON ORE CONCENTRATE

[75] Inventors: Carl-Lennart Axelsson, Enskede; Krister Torssell, Söderbärke, both of Sweden

[73] Assignee: IPS Interproject Service AB, Bettna, Sweden

[21] Appl. No.: 676,198

[22] PCT Filed: Feb. 24, 1984

[86] PCT No.: PCT/SE84/00067
§ 371 Date: Oct. 24, 1984
§ 102(e) Date: Oct. 24, 1984

[87] PCT Pub. No.: WO84/03521
PCT Pub. Date: Sep. 13, 1984

[30] Foreign Application Priority Data

Mar. 2, 1983 [SE] Sweden .............................. 8301159

[51] Int. Cl.⁴ .............................................. C21B 13/14
[52] U.S. Cl. .................................................... 75/40
[58] Field of Search ...................................... 75/38, 40

[56] References Cited

U.S. PATENT DOCUMENTS 4,045,214  8/1977  Wetzel et al. ............................ 75/46
4,238,226  12/1980  Sanzenbacher et al. ................ 75/38
4,434,003  2/1984  Geskin ..................................... 75/40

Primary Examiner—Melvyn J. Andrews
Attorney, Agent, or Firm—Silverman, Cass & Singer, Ltd.

[57] ABSTRACT

A process for producing pig iron from iron ore concentrate, in a reactor vessel into which iron ore concentrate, coal, oxygen gas and slag formers are injected beneath the surface of a molten iron bath. According to the invention, the ratio $CO_2/CO$ in the waste gas (11) from the reactor (2) is increased to a value higher than corresponding to the condition of equilibrium at atmospheric pressure. As a result greater heat is generated in the bath for a specific coal amount. The injected amount of coal in relation to injected amount of concentrate is predetermined for finally reducing pre-reduced iron ore concentrate (4) in the reactor (2). According to the invention, CO and $H_2$ in the exhaust gas is passed to a pre-reduction step (1), where unreduced iron ore concentrate is pre-reduced and thereafter can be injected into the reactor.

According to a preferred embodiment, the reactor (2) is pressurized to cause the $CO_2/CO$ ratio to increase.

7 Claims, 2 Drawing Figures

PROCESS OF PRODUCING PIG IRON FROM IRON ORE CONCENTRATE

This invention relates to a process of producing iron. The invention, more precisely, refers to a process of iron production using a reactor, into which the reactants are injected beneath the surface of a molten bath.

A reactor for gas production where pig iron production occurs is known from Canadian Pat. No. 1,097,078.

The Canadian patent discloses a process which produces a gas mixture of substantially carbon monoxide (CO) and hydrogen gas ($H_2$) from coal containing a certain amount of water. This is carried out according to the patent, by injecting carbon into a molten bath in a stoichiometric excess relative to the oxygen injected in the form of iron oxides into the molten bath, and, simultaneously, oxygen gas is injected in order to oxidize the excess carbon. Thus, the object of process is to produce gas, but a considerable amount of pig iron is also produced by this process.

In SE-PS No. 8103201-3 also a process of coal gasification using a reactor is described. According to this patent, carbon, oxygen gas and iron oxides are injected, with the iron oxides serving as a coolant. Carbon is injected in a stoichiometric excess relative to oxygen in the form of oxides in the bath. The invention according to the patent comprises the step of pressurizing the reactor, whereby a substantially greater amount of gas can be generated, because a greater amount of carbon and oxygen gas can be injected in relation to the bath size than under atmospheric pressure. The object of this patent is a high gas production, and the pig iron formed in this case is to be regarded as a byproduct.

The patents referred to above, thus, relate to processes of gas production where highest possible gas production is the objective. The additional production of pig iron is carried out by a continuous renewal of the molten bath in order to prevent the bath from being too heavily contaminated by impurities introduced with the coal.

The present invention relates to a pig iron production process where the maximum utilization of the energy content of the coal is obtained. Maximum energy utilization of coal implies that only carbon dioxide ($CO_2$) leaves the process and at the same time a minimum quantity of coal is supplied to the process. The present invention, more precisely, relates to a process where pre-reduction as well as final reduction are integrated in a process and the energy content of the coal supplied is utilized at maximum. The present invention, thus, refers to a process of producing pig iron from iron ore concentrate, in which ore concentrate, coal, oxygen gas and slag formers are injected into a reactor vessel beneath the surface of a molten bath in the reactor. The invention is characterized in that the ratio $CO_2/CO$ in the waste gas is increased to a value higher than corresponding to the condition of equilibrium at atmospheric pressure, whereby increased heat is generated in the bath for a specific coal amount, than the amount of injected coal in relation to ore concentrate is predetermined to be sufficient for a final reduction of pre-reduced ore concentrate in the reactor, and that CO and $H_2$ in the exhaust gas are directed to a pre-reduction step, in which unreduced ore concentrate is pre-reduced and thereafter injected into the reactor. In a pre-reduction step ore concentrate is reduced to a degree, which is optimum for the final reduction in a reactor.

By completely reducing ore concentrate by means of melt reduction in a reactor while supplying coal, CO is formed and will be found in the waste gas from the reactor. The exhaust gas is cleaned from $CO_2$ by washing whereafter remaining CO is used to pre-reduce unreduced ore concentrate, in which the CO is oxidized to $CO_2$. According to the process, therefore, coal is supplied to the reactor only in an amount sufficient for the final reduction of the pre-reduced ore concentrate in the reactor. Such an amount of coal is sufficient so that in the waste gas there shall be sufficient CO in order to pre-reduce the unreduced iron ore concentrate in the pre-reduction step. In this process, therefore, the coal consumption is lower than in known processes. The lower coal consumption reduces generated gas, dust and slag.

One object of the invention is to avoid large gas, dust and slag amounts and to minimize the use of coal, because large amounts of gas, dust and slag create considerable handling problems.

DETAILED DESCRIPTION OF THE INVENTION

Figure 1:
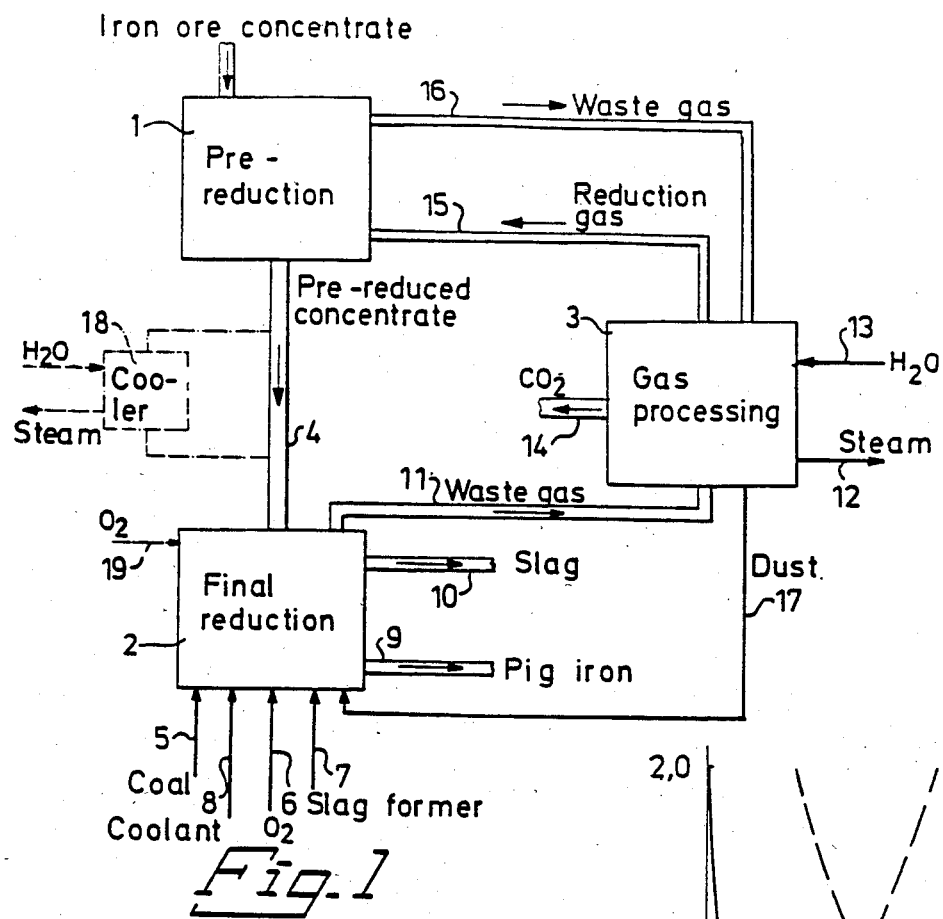
FIG. 1 is block diagram of a process according to the invention.

The reduction of iron oxide requires access to reducing agents and can be described by the reactions

$$FeO_x + XCO \rightarrow Fe + XCO_2 \tag{1a}$$

$$FeO_x + XC \rightarrow Fe + XCO \tag{1b}$$

$$FeO_x + XH_2 \rightarrow Fe + XH_2O \tag{2}$$

The reaction according to (1a) and (2) can proceed in solid phase to 100% reduction, and the product thereof is called sponge iron. This sponge iron must then be smelted and refined prior to casting and working. When the solid-phase reduction is not carried out to completion, the ore concentrate is only partially reduced. The degree of reduction can be described by the expression

$$FeO_x \tag{3}$$

where x can vary between 0 and 1,5.

A corresponding reaction process (1b) can take place in a molten carbonaceous iron bath. The gas-phase formed from the reactions described above then has a composition, which is determined by the reactions

$$CO_2 + C \rightleftharpoons 2CC \tag{4}$$

and

$$H_2O + CO \rightleftharpoons Co_2 + H_2 \tag{5}$$

Reaction (4) is substantially displaced to the right at high temperatures and low oxygen potential, i.e. under conditions prevailing in a molten iron bath with more than 1% C. Reactions (4) and (5) together yield a gas composition with more than 98% $CO + H_2$ from the molten iron bath. This is the case at SE-PS . . . (patent application No. 7706876-5) referred to above.

When the reduction proceeds at a lower temperature in solid phase, the resulting gas composition will have higher contents of $CO_2$ and $H_2O$.

The gas generated in a molten iron bath at about 1500° C. by reaction (1b), (4) and (5) can be supplied to a pre-reduction unit at 800°–1000° C. from which the exhaust gas will have $CO_2+H_2O$ content, which is several times higher than exhaust gas from the molten iron bath. When the gas reduction is carried out in steps, for example in two to three reactors connected in series, or when the ore concentrate contacts the reduction gas in counterflow, the reduction potential in the gas will be utilized effecively.

There will, however, always remain a certain proportion of CO and $H_2$ in the exhaust gas resulting from the pre-reduction. This residue can be recycled after $CO_2$ and $H_2O$ have been washed from the gas. In this manner, the energy content in the reduction gas can be entirely utilized. The above conditions exist when the system is at equilibrium.

The reactions

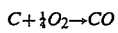

$$C + \tfrac{1}{2}O_2 \rightarrow CO \tag{6}$$

and

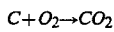

$$C + O_2 \rightarrow CO_2 \tag{7}$$

are exothermic, and the reaction (7) generates about 250% more heat than reaction (6). In contrast, the reaction (1b) is endothermic and, thus, requires energy.

Reduction of iron oxide to a metallic product, therefore, it is not necessary to supply energy because the reactions (6) or (7) yield more heat then required by reaction (1b).

In a molten iron bath, carbon-carrying material is supplied in such proportions relative to oxygen gas and iron oxide, that energy balance is achieved. Under the conditions existing in a molten iron bath, reaction (6) will be entirely dominating in relation to reaction (7). When pit coal is used, for example steam coal with a certain content of volatile constituents, reaction (6) must generate enough heat not only for reduction of iron oxide, but also the smelting of ash in feed coal and the cracking of the hydrocarbons found in the coal. This means under realistic conditions an unacceptably high coal consumption for producing iron and, in addition, very large amounts of gas of a mean value consisting of CO and $H_2$ (>98%) are generated. These are serious disadvantages in production of pig iron.

In the process of this invention the consumption coal is decreased, and required only for reducing pre-reduced ore concentrate. In order to generate the necessary heat, that reaction (7) is promoted over reaction (6) and, the ratio $CO_2/Co$ in the exhaust gas from the reactor is increasing to a value higher than corresponding to the ratio at atmospheric pressure. This process produces more $CO_2$ and, therefore, the heat generation of reaction (7) is utilized in the reactor. The ratio $CO_2/CO$, however, is limited to provide a sufficient amount of CO in the exhaust gas for pre-reducing unreduced ore concentrate to a predetermined degree.

The following Table illustrates how the amount of coal required for the reduction of ore concentrate with X=1.33 varies with the ratio $CO_2/CO$ in the exhaust gas from a reactor.

| $CO_2/CO$ | Coal (kg/t Fe) | Waste gas ($m^3$/n/t Fe) | Slag (kg/t Fe) |
|---|---|---|---|
| 0.005 | 5280 | 11640 | 1766 |
| 0.055 | 2664 | 5752 | 876 |
| 0.5 | 774 | 1521 | 464 |

As appears from the Table, the necessary coal demand can be decreased very substantially by increasing the ratio $CO_2/CO$. The amount of CO required in the exhaust gas to produce pre-reduction of the ore concentrate requires that the magnitude of the ratio $CO_2/CO$ must not exceed 3. Even when coal consumption is low, the $CO_2/CO$ ratio can be increased in order to generate more heat in the reactor, and still maintain a sufficient amount of CO in the exhaust gas for carrying out the pre-reduction.

Figure 2:
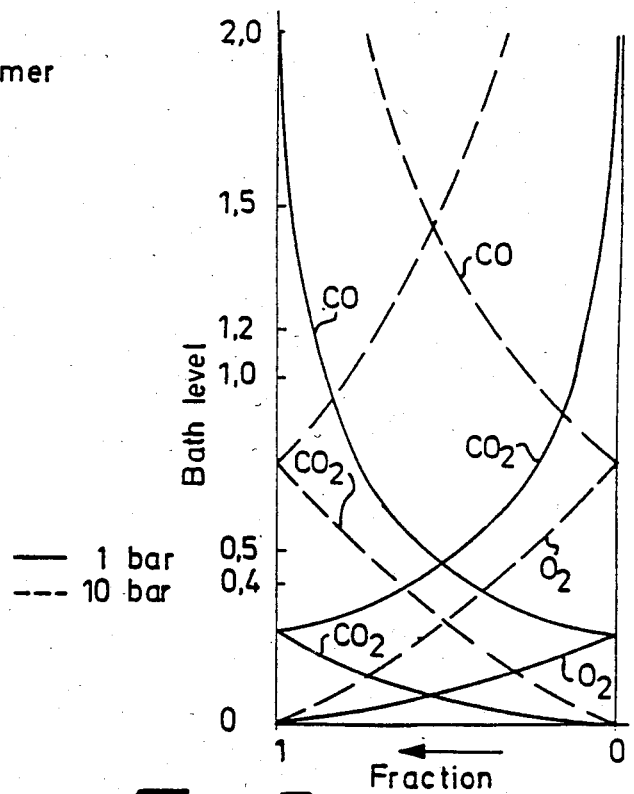
FIG. 2 is a correlation diagram which shows the fraction of $O_2$, $CO_2$ and CO in the exhaust gas as a function of bath level and pressure.

According to the invention, two examples of processes for increasing the ratio to a value, which is higher than corresponding to the condition of equilibrium at atmospheric pressure, are described as follows with reference to the accompanying drawing, in which FIG. 1 is a block diagram of a process according to the invention and FIG. 2 is a correlation diagram.

In FIG. 1 a pre-reduction step 1 and a final reduction step 2 are shown. The pre-reduction step 1 can include a two-step or three-step fluidized bed, to which ore concentrate is supplied continuously in the form of concentrate or micropellets, which have been pre-heated, for example to 250° C., in a pre-heating unit (not shown). The ore concentrate can be admixed with coal or coke. From the gas effluent from the pre-reduction step 1, a portion containing $CO$—$CO_2$—$H_2$—$H_2O$ can be cleaned from dust in cyclones and recycled to the pre-heating unit. The remaining portion of exhaust gases is recycled via a gas processing unit 3 to the pre-reduction step 1. The pre-reduced iron ore concentrate is passed, optionally with an intermediate storage, to the final reduction step 2 as indicated by the arrow 4.

When a shaft furnace is employed in the pre-reduction step, a pre-heating unit is not required.

The final reduction step 2 comprises a reactor with ceramic lining which contains a carbonaceous iron bath with a carbon content exceeding 1% at a temperature of 1400°–1550° C. The reactor is supplied with pre-reduced iron ore concentrate 4, coal 5, oxygen gas ($O_2$) 6 and slag former 7 (for example CaO). In addition, when appropriate, a coolant 8 is supplied which, for example, can be water. These materials preferably are supplied to the reactor via injection nozzles in the lower part of the reactor, i.e. beneath the surface of the iron bath. Pre-reduced iron concentrate, however, can be supplied via injection nozzles located above the surface of the bath or at the slag line.

Pig iron 9 and slag 10 formed in the final reduction step 2 can be tapped continuously or discontinuously in known manner.

The exhaust gas 11 formed in the final reduction step 2 is passed to a gas processing unit 3 where the gas partially is cleaned from $CO_2$ by washing, and partially is cooled by steam generation 12 from supplied water 13 and partially is cleaned from dust. The $CO_2$ separated is cooled and discharged to the free atmosphere.

The gas processing unit 3 also comprises heat exchangers for increasing the temperature of the gas after it has been cooled in the $CO_2$-washing and dust cleaning.

The reduction gas 15 leaving the gas processing unit 3 is substantially CO and $H_2$. The gas 15 is passed to the pre-reduction step 1 where it is oxidized and substantially converted to $CO_2$ and $H_2O$. The exhaust gas 16 from the pre-reduction step 1 is returned to the gas processing unit 3 where remaining CO content is recovered and returned to the pre-reduction step 1 as reduction gas 15.

In the gas processing unit 3 dust 17 is removed from the exhaust gas 11 from the reactor. The dust 17 is injected into the reactor in the final reduction step 2. When the CO-content in the exhaust gas 11 is relatively high, the exhaust gas 11 can be passed directly from the reactor 2 to the pre-reduction step 1 and mixed with reduction gas 15 from the gas processing unit 3.

A cooler 18 can be provided for cooling the pre-reduced iron ore concentrate 4.

As mentioned above, there are at least two methods to increase the ratio $CO_2/CO$ to a value greater than the value corresponding to the condition of equilibrium at atmospheric pressure.

In a first method the reactor is maintained at a total pressure greater than atmospheric pressure and up to 50 bar, preferably about 2 to 10 bar standard atmospheres.

In SE-PS No. 8103201-3 previously referred to the reactor, is pressurized. The reason why the reactor according to that invention is pressurized is to increase the mass flow through the reactor without increasing the volumetric flow and to generate more gas than generated at atmospheric pressure.

It also is known from SE-PS No. 8103201-3 that reaction (4) above is displaced to the left at increased pressure, whereby the $CO_2/CO$ ratio increases.

In this invention, however, increased pressure influences the kinetic conditions in the iron bath of the reactor, so that there is not sufficient time to reach the equilibrium according to reaction (4) at the elevated pressure. This condition is illustrated in FIG. 2, which shows the fraction of $O_2$, $CO_2$ and CO in the exhaust gas as a function of bath level and pressure. The diagram is representative, because the fractions are affected by the injection speed. Oxygen gas is injected from the reactor bottom. The oxygen potential there is high, and the oxygen gas oxidizes carbon in the bath to $CO_2$. During the retention time of the gas, $CO_2$ is reduced by the carbon in the bath via reaction (4) to CO. Reaction (5) determines the ratio $H_2O/H_2$. When the gas leaves the bath before equilibrium has been achieved, the generated combustion heat is dissipated in reduction. Increased pressure diagram, as appears from FIG. 2, results in the amount of $CO_2$ increases in relation to the amount of CO above a bath level of about 0,4 m. The solid lines indicate the fractions adjusted for the kinetic effects at atmospheric pressure. The dashed lines indicate corresponding fractions at superatmospheric pressure of 10 bar; higher the pressure, and the higher the injection speed, the stronger is the kinetic effect.

By pressurizing the reactor, the exhaust gas will contain a ratio of $CO_2$ in relation to CO which is higher than at atmospheric pressure. At a bath level of about 1.2 m and a total pressure of 10 bar, exhaust gas is generated with a $CO_2/CO$ ratio of about 3. As appears from FIG. 2, a bath level can be chosen where the ratio is substantially higher or substantially lower.

Preferably, the total pressure of the reactor is adjusted by conventional pressure control devices, in order to adjust the ratio $CO_2/CO$ in the exhaust gas to a desired value.

In an alternative method, the level of the metal bath is adjusted by controlling the rate at which material is injected and, tapped in order to adjust the $CO_2/CO$ ratio in the exhaust gas to a desired value. The bath level and pressure, of course, must be determined in view of the operating conditions, for example desired reactor volume, reactor capacity and required amount of CO in the exhaust gas for pre-reduction, and in relation to minimizing the coal demand.

The increase of the $CO_2/CO$ ratio in the exhaust gas by pressurizing the reactor results in a larger heat generation, in the bath for a specific amount of coal supplied, when the strong exothermic reaction (7) governs. A relatively lower amount of coal can generate sufficient heat for the reduction of the pre-reduced iron ore concentrate under superatmospheric pressure in comparison to atmospheric pressure, due to kinetic effect, and the displacement of the reaction (4) to the left. The displacement of the reaction (4) to the left at higher pressure, in relation to equilibrium, however, represents only a small contribution to an increased $CO_2/CO$ ratio compared to the kinetic effect described above.

In another alternative method, oxygen gas 19 is injected to the surface of the reactor bath under atmospheric pressure. At atmospheric pressure, the $CO_2/CO$ ratio is low in the exhaust gas at the reactor bath surface. By burning CO to $CO_2$ at the surface using oxygen gas, a large amount of heat is generated, and transmitted from the bath surface downward to heat the bath and. As a result the ratio $CO_2/CO$ in the exhaust gas 11 from the final reduction step 2 is substantially higher than the corresponding condition of equilibrium at the bath surface under atmospheric pressure when oxygen gas is not added above the both surface. Pressurization of reactor 2 is the preferred method for adjusting and additionally increasing the $CO_2/CO$ ratio.

Such adjustment is made in view of the CO demand for the pre-reduction step 1. The CO-generated should correspond to or only slightly exceed the amount required for pre-reducing the unreduced iron ore concentrate. The amount of hydrogen gas ($H_2$) in the exhaust gas must be taken into consideration as a reducing gas.

Broadly the process of the invention generates sufficient heat in the final reduction step for melting and reducing a pre-reduced iron ore concentrate. Low coal consumption is achieved by a higher degree of combustion exhaust gas from the final reduction step than the degree determined by the equilibrium with a carbonaceous iron bath at atmospheric pressure. The most effective heat generation is obtained when the heat development takes place in the bath resulting when the final reduction step is pressurized. The CO in the exhaust gas is utilized for the pre-reduction. In the final reduction step only pre-reduced iron ore concentrate must be finally reduced.

The process of the invention results in a low coal consumption, and reduced generation in of exhaust gas and dust in relation to the amount of pig iron produced, compared to known processes in which a reactor vessel is employed.

The process of the present invention can have many, especially regarding the design of the processing units.

The invention, therefore, is not restricted to the embodiments described, but can be varied within the scope of the attached claims.

We claim:

1. In a process for producing pig iron by reducing iron ore concentrate in which solid pre-reduced iron ore, coal, oxygen gas, and slag formers are injected beneath the surface of a molten iron bath contained in a reactor vessel, and react to produce said pig iron, slag, and exhaust gases including $CO_2$, $CO$, $H_2$ and $H_2O$, the improvement comprising:

A. adjusting the ratio $CO_2/CO$ in the exhaust gases from said vessel to a value greater than the ratio corresponding to equilibrium condition between the carbon in the bath and the $CO_2CO$ gases at the surface of the bath under atmospheric pressure, and maintaining the value of said ratio at at least 0.055 but not greater than 3 in order to increase the heat generated by the bath while minimizing the amount of coal injected for final reduction of the iron ore injected therein; and B. reacting $CO$ and $H_2$ in said exhaust gases with iron ore for pre-reduction thereof prior to injection of the ore into said bath, wherein the amount of coal injected into said vessel is sufficient to generate a quantity of $CO$ sufficient, together with said $H_2$, for said pre-reduction, based on the quantity of iron ore being pre-reduced, and the $CO_2/CO$ ratio.

2. The process of claim 1, comprising maintaining the total pressure in said reactor vessel greater than atmospheric pressure up to 50 bar in step A, in order to adjust said ratio.

3. The process of claim 2, wherein said total pressure is within the range of about 2–10 bar.

4. The process of claim 1 or 2, comprising injecting oxygen gas above the surface of said bath in step A in order to oxidize $CO$ for adjusting said ratio and supplying additional heat to said bath.

5. The process of claim 1 or 2, comprising variably adjusting the total pressure in said reactor vessel in step A in order to adjust said ratio.

6. The process of claims 1 or 2, comprising adjusting the level of said bath within said reactor vessel in step A in order to adjust said ratio.

7. The process of claim 1, wherein the reaction in step B is performed in a fluidized bed of said ore.

* * * * *